(12) United States Patent
Kohlmann et al.

(10) Patent No.: US 9,326,171 B2
(45) Date of Patent: Apr. 26, 2016

(54) ENHANCING DATA THROUGHPUT USING MULTIPLE RECEIVERS

(71) Applicant: QUALCOMM Incorporated, San Diego, CA (US)

(72) Inventors: Michael Kohlmann, San Francisco, CA (US); Charles James Persico, San Diego, CA (US); Beomsup Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 14/203,000

(22) Filed: Mar. 10, 2014

(65) Prior Publication Data

US 2015/0257022 A1    Sep. 10, 2015

(51) Int. Cl.

| | |
|---|---|
| H03J 7/32 | (2006.01) |
| H04W 24/08 | (2009.01) |
| H04B 1/18 | (2006.01) |
| H04B 1/00 | (2006.01) |
| H04B 1/3805 | (2015.01) |

(52) U.S. Cl.
CPC .............. *H04W 24/08* (2013.01); *H04B 1/0082* (2013.01); *H04B 1/18* (2013.01); *H04B 1/3805* (2013.01)

(58) Field of Classification Search
CPC ... H04B 7/0413; H04W 36/30; H04W 72/085
USPC .......................... 455/132, 131, 143, 146, 144
See application file for complete search history.

(56) References Cited

U.S. PATENT DOCUMENTS

| | | | |
|---|---|---|---|
| 7,916,672 B2 | 3/2011 | Elahi et al. | |
| 8,160,521 B2 | 4/2012 | Iizuka et al. | |
| 8,306,480 B2 | 11/2012 | Muhammad et al. | |
| 8,594,579 B2 | 11/2013 | Muhammad | |
| 2007/0243832 A1* | 10/2007 | Park ....................... | H04B 1/406 455/73 |
| 2008/0261651 A1* | 10/2008 | Nakahashi ........... | H04B 1/0057 455/553.1 |
| 2012/0302188 A1 | 11/2012 | Sahota et al. | |
| 2013/0122840 A1 | 5/2013 | Jung et al. | |
| 2013/0288623 A1 | 10/2013 | Hagen et al. | |
| 2014/0018026 A1 | 1/2014 | Klepser et al. | |

OTHER PUBLICATIONS

International Search Report and Written Opinion—PCT/US2015/016485—ISA/EPO—Jul. 1, 2015.
Partial International Search Report—PCT/US2015/016485—ISA/EPO—Apr. 24, 2015, 5 pages.

* cited by examiner

*Primary Examiner* — Tu X Nguyen (74) *Attorney, Agent, or Firm* — Toler Law Group (57) ABSTRACT

An apparatus includes a first low noise amplifier (LNA) in a first receive path. The apparatus further includes receive circuitry in the first receive path. The receive circuitry is configured to receive an output of the first LNA and to receive an output of a second LNA within a second receive path.

20 Claims, 8 Drawing Sheets

ENHANCING DATA THROUGHPUT USING MULTIPLE RECEIVERS

I. FIELD

The present disclosure is generally related to receivers for electronic devices.

II. DESCRIPTION OF RELATED ART

Advances in technology have resulted in smaller and more powerful electronic devices. For example, there currently exist a variety of mobile devices, such as wireless telephones, personal digital assistants (PDAs), and paging devices. The mobile devices may be small, lightweight, and easily carried by users. Wireless telephones, such as cellular telephones and Internet Protocol (IP) telephones, can communicate voice and data packets over wireless networks. Further, many wireless telephones include other types of devices that are incorporated therein. For example, a wireless telephone can also include a digital still camera, a digital video camera, a digital recorder, and an audio file player. Also, wireless telephones can process executable instructions, including software applications, such as a web browser application, that can be used to access the Internet. As such, wireless telephones and other wireless devices can include significant computing capabilities.

A wireless device may receive wireless signals using a receiver. The wireless device may use the receiver to perform certain operations to maintain network connectivity. For example, the wireless device may use the receiver to measure signal strength of received signals. Maintaining network connectivity may reduce performance of the wireless device by consuming processing and other resources.

IV. DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
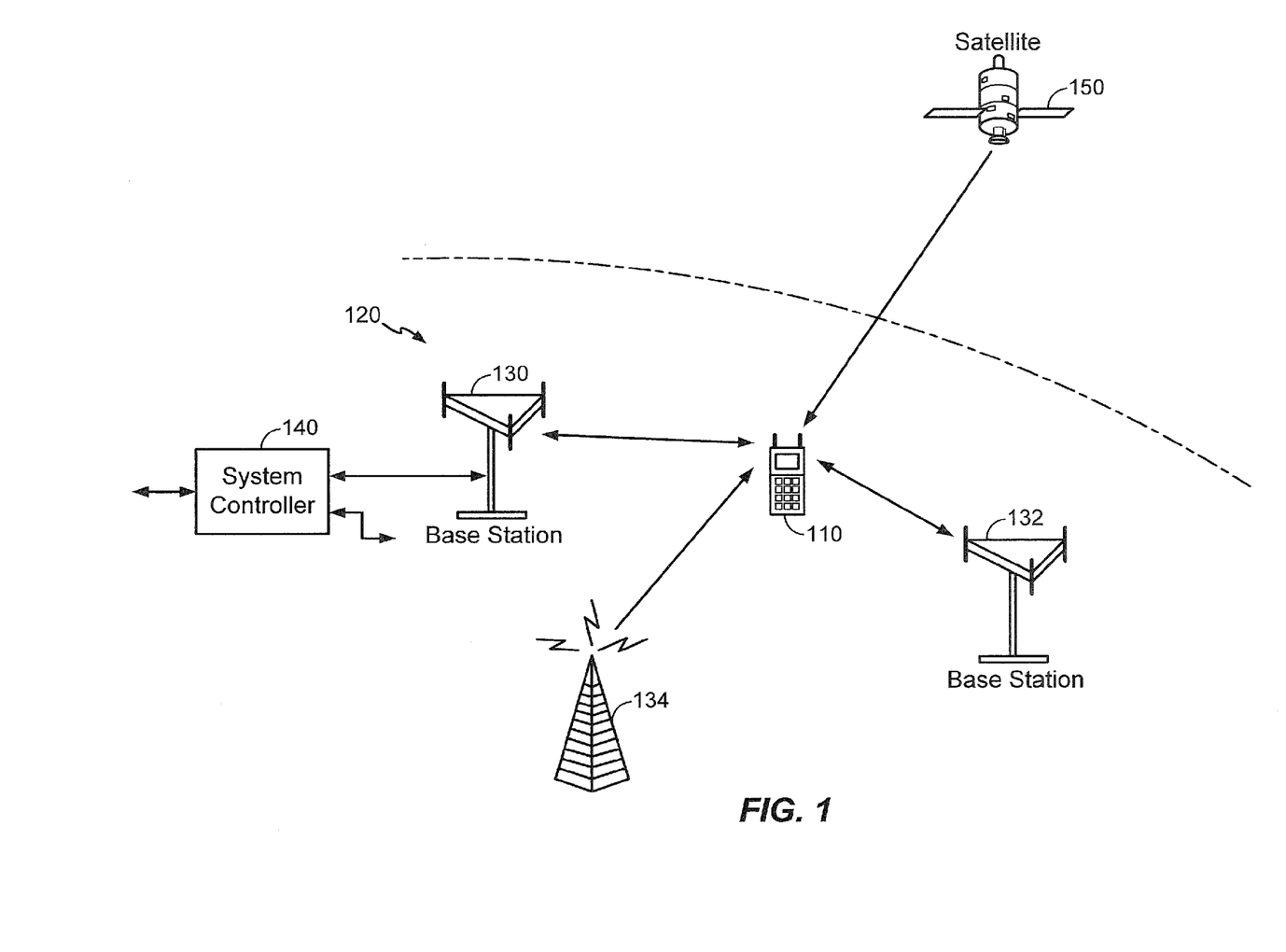
FIG. 1 shows a wireless device communicating with a wireless system.

FIG. 1 shows a wireless device 110 communicating with a wireless communication system 120. Wireless communication system 120 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 120. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1×, EVDO, TD-SCDMA, GSM, 802.11, etc.

FIG. 1 illustrates that a wireless device in accordance with the present disclosure (e.g., the wireless device 110) may communicate with a wireless communication system, such as the wireless communication system 120. As described further with reference to FIGS. 2-5, the wireless device 110 may include multiple receivers. The wireless device 110 may utilize the multiple receivers including an auxiliary receiver to increase data throughput of a primary receiver.

Figure 2:
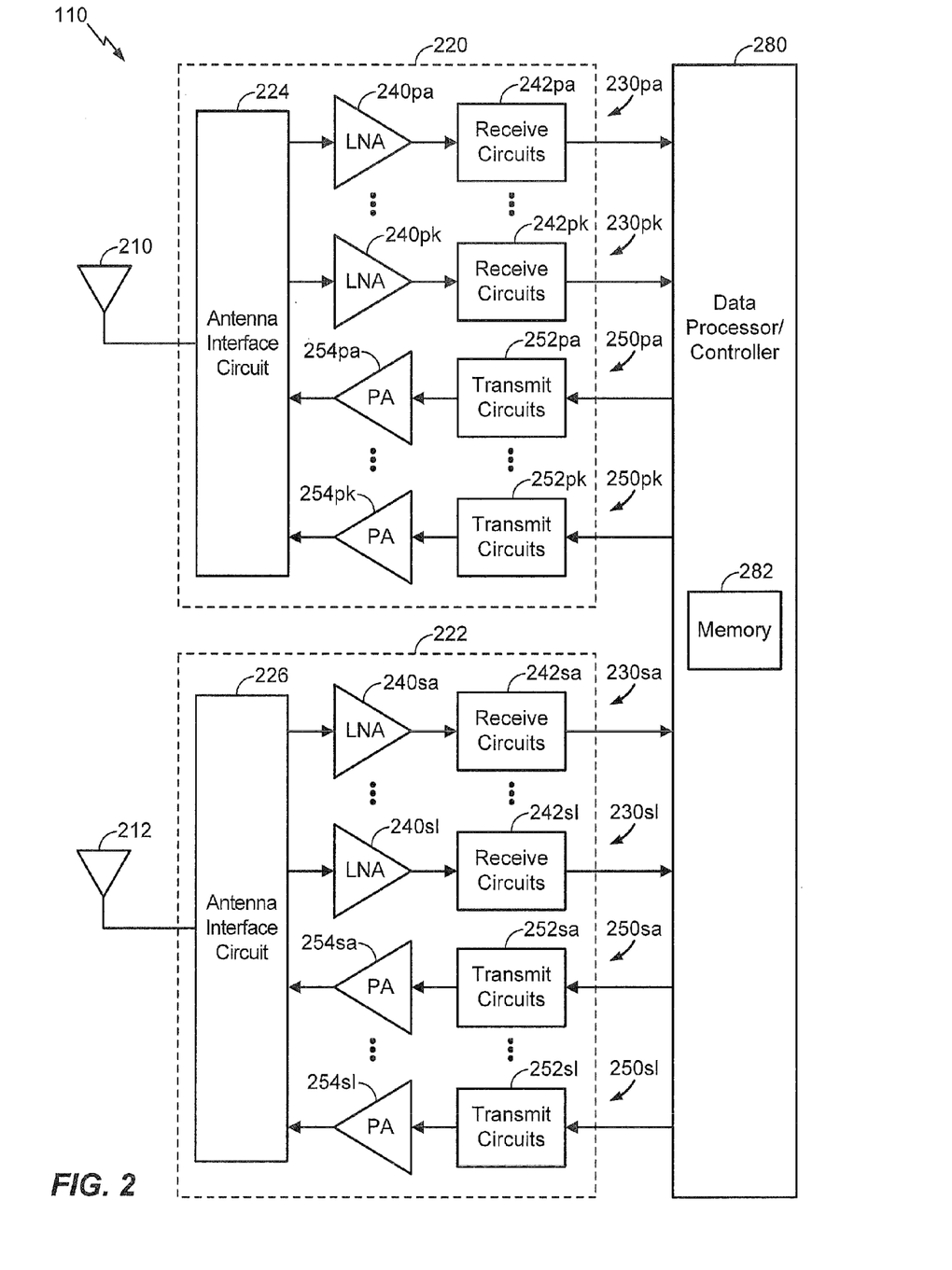
FIG. 2 shows a block diagram of the wireless device in FIG. 1.

FIG. 2 shows a block diagram of an exemplary design of wireless device 110 in FIG. 1. In this exemplary design, wireless device 110 includes a transceiver 220 coupled to a primary antenna 210, a transceiver 222 coupled to a secondary antenna 212, and a data processor/controller 280. Transceiver 220 includes multiple (K) receivers 230$pa$ to 230$pk$ and multiple (K) transmitters 250$pa$ to 250$pk$ to support multiple frequency bands, multiple radio technologies, carrier aggregation, etc. Transceiver 222 includes multiple (L) receivers 230$sa$ to 230$sl$ and multiple (L) transmitters 250$sa$ to 250$sl$ to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 2, each receiver 230 includes an LNA 240 and receive circuits 242. For data reception, antenna 210 receives signals from base stations and/or other transmitter stations and provides a received RF signal, which is routed through an antenna interface circuit 224 and presented as an input RF signal to a selected receiver. Antenna interface circuit 224 may include switches, duplexers, transmit filters, receive filters, matching circuits, etc. The description below assumes that receiver 230pa is the selected receiver. Within receiver 230pa, an LNA 240pa amplifies the input RF signal and provides an output RF signal. Receive circuits 242pa downconvert the output RF signal from RF to baseband, amplify and filter the downconverted signal, and provide an analog input signal to data processor 280. Receive circuits 242pa may include mixers, filters, amplifiers, matching circuits, an oscillator, a local oscillator (LO) generator, a phase locked loop (PLL), etc. Each remaining receiver 230 in transceivers 220 and 222 may operate in similar manner as receiver 230pa.

In the exemplary design shown in FIG. 2, each transmitter 250 includes transmit circuits 252 and a power amplifier (PA) 254. For data transmission, data processor 280 processes (e.g., encodes and modulates) data to be transmitted and provides an analog output signal to a selected transmitter. The description below assumes that transmitter 250pa is the selected transmitter. Within transmitter 250pa, transmit circuits 252pa amplify, filter, and upconvert the analog output signal from baseband to RF and provide a modulated RF signal. Transmit circuits 252pa may include amplifiers, filters, mixers, matching circuits, an oscillator, an LO generator, a PLL, etc. A PA 254pa receives and amplifies the modulated RF signal and provides a transmit RF signal having the proper output power level. The transmit RF signal is routed through antenna interface circuit 224 and transmitted via antenna 210. Each remaining transmitter 250 in transceivers 220 and 222 may operate in similar manner as transmitter 250pa.

FIG. 2 shows an exemplary design of receiver 230 and transmitter 250. A receiver and a transmitter may also include other circuits not shown in FIG. 2, such as filters, matching circuits, etc. All or a portion of transceivers 220 and 222 may be implemented on one or more analog integrated circuits (ICs), RF ICs (RFICs), mixed-signal ICs, etc. For example, LNAs 240 and receive circuits 242 may be implemented on one module, which may be an RFIC, etc. The circuits in transceivers 220 and 222 may also be implemented in other manners.

Data processor/controller 280 may perform various functions for wireless device 110. For example, data processor 280 may perform processing for data being received via receivers 230 and data being transmitted via transmitters 250. Controller 280 may control the operation of the various circuits within transceivers 220 and 222. A memory 282 may store program codes and data for data processor/controller 280. Data processor/controller 280 may be implemented on one or more application specific integrated circuits (ASICs) and/or other ICs.

Wireless device 110 may support multiple band groups, multiple radio technologies, and/or multiple antennas. Wireless device 110 may include a number of LNAs to support reception via the multiple band groups, multiple radio technologies, and/or multiple antennas.

FIGS. 1 and 2 therefore illustrate that a wireless device may include multiple receivers in accordance with one or more exemplary embodiments of the present disclosure. For example, as described further with reference to FIGS. 3-5, the wireless device 110 of FIGS. 1-2 may utilize multiple receivers to increase data throughput. For example, the wireless device 110 may utilize an auxiliary receiver to increase data throughput of a primary receiver.

Figure 3:
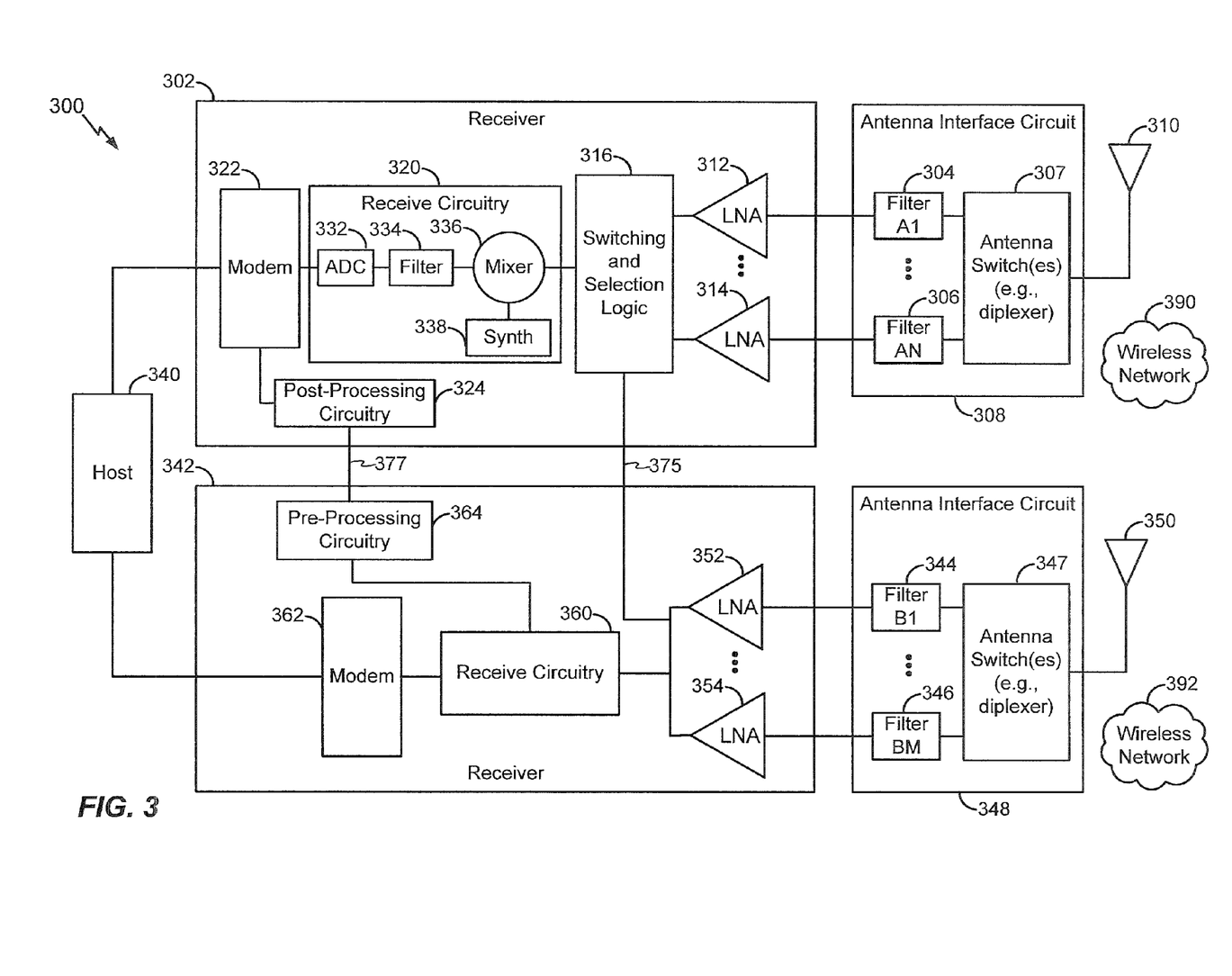
FIG. 3 is a block diagram that depicts an exemplary embodiment of a system that may be included in the wireless device of FIG. 1.

Referring to FIG. 3, an exemplary embodiment of a system 300 is shown. Components of the system 300 may correspond to components of the wireless device 110 of FIGS. 1 and 2. For example, the system 300 may include antennas 310, 350, which may correspond to the antennas 210, 212. As another example, the system 300 may include antenna interface circuits 308, 348, which may correspond to the antenna interface circuits 224, 226. The system 300 may further include receivers 302, 342, which may correspond to any of the receivers 230 of FIGS. 1 and 2. The system 300 may further include a host 340, which may correspond to the data processor/controller 280.

The antenna interface circuit 308 may include circuitry coupling the antenna 310 to the receiver 302, and the antenna interface circuit 348 may include circuitry coupling the antenna 350 to the receiver 342. For example, the antenna interface circuit 308 may include one or more antenna switches 307 (e.g., a frequency multiplexer or a diplexer) and filters 304, 306. As another example, the antenna interface circuit 348 may include one or more antenna switches 347 (e.g., a frequency multiplexer or a diplexer) and filters 344, 346. The one or more antenna switches 307 may selectively couple the filters 304, 306 to the antenna 310, and the one or more antenna switches 347 may selectively couple the filters 344, 346 to the antenna 350.

The receivers 302, 342 may receive information from one or more communication networks. In the example of FIG. 3, the receiver 302 may receive information from a wireless network 390, and the receiver 342 may receive information from a wireless network 392. One or both of the wireless networks 390, 392 may be included in the wireless communication system 120 of FIG. 1. In an exemplary, non-limiting implementation, one of the wireless networks 390, 392 corresponds to a wide area network (WAN), such as a cellular network, and the other of the wireless networks 390, 392 corresponds to a local data network, such as a wireless local area network (WLAN). In an exemplary, non-limiting embodiment, the receiver 302 is configured to receive signals using channels having frequencies within a first frequency range, and the receiver 342 is configured to receive signals using channels having frequencies within a second frequency range. The first frequency range may correspond to a 2.3 to 2.7 gigahertz (GHz) frequency range, and the second frequency range may correspond to a 2.4 to 2.5 GHz frequency range, as illustrative examples. The wireless networks 390, 392 may comply with one or more communication standards. For example, one of the wireless networks 390, 392 may comply with a Long Term Evolution (LTE) communication standard, and the other of the wireless networks 390, 392 may comply with an Institute of Electrical and Electronics Engineers (IEEE) communication standard (e.g., an IEEE 802.11 communication standard), as illustrative examples.

In the example of FIG. 3, the receiver 302 includes a low noise amplifier (LNA) 312 and an LNA 314. The receiver 302 further includes switching and selection logic 316 that is coupled to outputs of the LNAs 312, 314. The switching and selection logic 316 may be coupled to receive circuitry 320 and to a connection 375. The connection 375 may correspond to a "shared" path that enables "sharing" of resources (e.g., sharing of one or more outputs of the LNAs 312, 314 with the receiver 342). The switching and selection logic 316 may include one or more switches and/or a multiplexer (MUX) configured to select between outputs of the LNAs 312, 314. The receiver 302 may further include a modem 322 and post-processing circuitry 324. FIG. 3 depicts that the receive circuitry 320 includes an analog-to-digital converter (ADC) 332, a filter 334, a mixer 336, and a frequency synthesizer 338.

The receiver 342 may include LNAs 352, 354. The receiver 342 may be coupled to the receiver 302 and to the LNAs 312, 314, such as via the switching and selection logic 316 and via the connection 375. The connection 375 is coupled to outputs of the LNAs 352, 354 via the switching and selection logic 316. The outputs of the LNAs 352, 354 may be coupled to receive circuitry 360. The receive circuitry 360 may be coupled to a modem 362 and to pre-processing circuitry 364. The receiver 342 may be coupled to the receiver 302. For example, the receiver 342 may be coupled to the receiver 302 via the connection 375. As another example, the receivers 302, 342 may be coupled via a connection 377.

The host 340 may be coupled to the receivers 302, 342, such as via the modems 322, 362. The host 340 may include a general purpose processor, an application specific processor, or a combination thereof. In an exemplary embodiment, the host 340 is configured to determine an idle receive time associated with the receiver 342. For example, the host 340 may determine whether the receive circuitry 360 is processing signals received via the antenna 350, such as based on whether the modem 362 is communicating with the host 340, whether the receiver 342 is associated with a network, etc. Alternatively or in addition, the receiver 342 may be configured to provide one or more indications to the host 340 and/or to the receiver 302 indicating that the receiver 342 is idle. The receiver 342 may perform network measurements for the receiver 302 while the receiver 342 is idle to increase data throughput of the receiver 302.

The filters 304, 306, 344, and 346 may be configured to filter certain signals. The filters 304, 306, 344, and 346 may correspond to band-pass filters that pass certain frequencies and "block" or suppress other frequencies. To illustrate, the example of FIG. 3 indicates that the filter 304 enables signals within a first frequency band (A1) (e.g., a first channel) to be provided to the LNA 312, and the filter 306 enables signals within an Nth frequency band (AN) (e.g., a second channel) to be provided to the LNA 314, where "N" is a positive integer. FIG. 3 further indicates that the filter 344 enables signals within a third frequency band (B1) (e.g., a third channel) to be provided to the LNA 352, and the filter 346 enables signals within an Mth frequency band (BM) (e.g., a fourth channel) to be provided to the LNA 354, where "M" is a positive integer that may be equal to or different than "N."

The LNAs 312, 314 may amplify the signals and may provide the amplified signals to the switching and selection logic 316. During a period when the receiver 342 is idle, the switching and selection logic 316 may provide amplified signals within the first frequency band (A1) and/or amplified signals within the Nth frequency band (AN) to the receive circuitry 360. For example, an amplified signal may be provided to the receiver 342 for network measurements while the amplified signal is provided to other stages of the receiver 302 (e.g., to the receive circuitry 320 and the modem 322) for data processing. In this example, the receiver 342 may perform network measurements on amplified signals within a first frequency band while the receiver 302 concurrently performs data processing on amplified signals within the same frequency band. To further illustrate, the receiver 342 may perform network measurements on amplified signals within the first frequency band (A1) while the receiver 302 concurrently performs data processing on amplified signals within the first frequency band (A1), or the receiver 342 may perform network measurements on amplified signals within the Nth frequency band (AN) while the receiver 302 concurrently performs data processing on amplified signals within the Nth frequency band (AN). In one or more other exemplary implementations, an amplified signal may be provided to the receiver 342 for network measurements while a different amplified signal is provided to other stages of the receiver 302 (e.g., the receive circuitry 320 and the modem 322) for data processing. In this example, the receiver 342 may perform network measurements on amplified signals within a frequency band while the receiver 302 concurrently performs data processing on amplified signals within a different frequency band. To further illustrate, the receiver 342 may perform network measurements on amplified signals within the first frequency band (A1) while the receiver 302 concurrently performs data processing on amplified signals within the Nth frequency band (AN) (or vice versa).

The receivers 302, 342 may be implemented using multiple integrated circuits or using a common integrated circuit. For example, the receiver 302 may be implemented using a first integrated circuit, and the receiver 342 may be implemented using a second integrated circuit. In this implementation, the connections 375, 377 may correspond to integrated circuit interfaces. To illustrate, the connections 375, 377 may include one or more input terminals, one or more output terminals, one or more output drivers, one or more input receivers, other input/output (I/O) logic, a serial interface, a parallel interface, a high speed interface, impedance matching circuitry, a clock domain interface, another structure, or a combination thereof. Alternatively, the receivers 302, 342 may be implemented within a common integrated circuit. In such an implementation, the connections 375, 377 may correspond to one or more nodes (e.g., a wire) of the common integrated circuit, as an illustrative example.

In operation, one of the receivers 302, 342 may correspond to a primary receiver that receives network measurements from an auxiliary receiver, such as the other of the receivers 302, 342, to enable an increased data throughput at the primary receiver. To illustrate, the receiver 302 may be configured to perform certain network measurements to maintain connectivity in a communication network. For example, the receiver 302 may search for communication channels and/or network devices with which to communicate in the communication network. Typically, performing such network measurements may involve adjusting a frequency of the receiver 302, such as by adjusting a frequency of the frequency synthesizer 338 of the receive circuitry 320. Performing such network measurements by the receiver 302 typically interrupts data processing operations of the receiver 302 by temporarily ceasing data reception operations at the receiver 302 in order to perform the network measurements by the receiver 302, reducing data throughput of the receiver 302.

In the example of FIG. 3, the receiver 342 may perform network measurements for the receiver 302. For example, during an idle receive time associated with the receiver 342, the receiver 302 may route a signal received via the antenna 310 to the receiver 342. For example, the receiver 302 may route a first signal generated by one of the LNAs 312, 314 to the receiver 342 via the connection 375. To route the first signal to the receiver 342, the receiver 302 may selectively activate and/or deactivate the switching and selection logic 316.

The switching and selection logic 316 may selectively couple an output of one of the LNAs 312, 314 to the connection 375 to route the first signal to the receiver 342 and to initiate measurements of the first signal at the receiver 342. The switching and selection logic 316 may route the first signal to the receiver 342 in response to a signal from the host 340 indicating that the receiver 342 is idle. Alternatively or in addition, the receiver 342 may provide an indication to the receiver 302 (e.g., via an interface between the receivers 302, 342) that the receiver 342 is idle. In this example, the receiver 342 may provide the indication to the switching and selection logic 316 (e.g., as an enable input to the switching and selection logic 316) to cause the switching and selection logic 316 to route the first signal to the receiver 302. The switching and selection logic 316 may include a splitter device that "duplicates" the first signal by providing the first signal to the receive circuitry 320 and further to the receiver 342 via the connection 375.

Upon receiving the first signal from the receiver 302, the receiver 342 may perform one or more network measurement operations to generate a second signal based on the first signal. The second signal may indicate network measurements usable by the receiver 302. The network measurements may indicate that a communication channel is available for use by the receiver 302, that a network device is within communication range of the receiver 302, or a combination thereof. To perform the one or more network measurement operations, the receiver 342 may tune the receive circuitry 360 to a frequency or frequency band. The frequency or frequency band may be specified by the host 340 or the receiver 302 via one or more signals (e.g., one or more signals sent by the receiver 302 via the connection 375). The frequency may correspond to a channel of the wireless network 390, and the network measurements may correspond to "samples" of a signal received via the channel.

The network measurements may indicate availability of a network resource, such as availability of the channel and/or availability of a network device (e.g., a base station) of the wireless network 390, as illustrative examples. In an exemplary embodiment, the network measurements indicate a signal strength, such as a signal-to-noise ratio (SNR), associated with a signal received via the channel and/or from the network device. The signal strength may indicate availability of the channel and/or the network device (such as if the signal strength satisfies a threshold). In an exemplary embodiment, the wireless network 390 corresponds to a WAN, and the network measurements correspond to a "cell search" for cells of the WAN. In one or more other embodiments, the wireless network 390 corresponds to a WLAN, and the network measurements correspond to a "channel scan" for channels of the WLAN. To generate the network measurements, the receive circuitry 360 may be responsive to a control signal from the receiver 302 or the host 340 to select one or more operating frequencies corresponding to channels of the WLAN. For example, a frequency synthesizer of the receive circuitry 360 may be responsive to a control signal to select the one or more operating frequencies, as described further with reference to FIG. 4.

Upon generating the second signal, the receive circuitry 360 may provide the second signal to the pre-processing circuitry 364. In an exemplary implementation, the pre-processing circuitry 364 performs one or more data processing operations based on the second signal to generate a third signal that may be provided to the receiver 302 via the connection 377. As an example, the pre-processing circuitry 364 may adjust (or "convert") a sampling rate of the second signal from a first sampling rate associated with the receiver 342 to a second sampling rate associated with the receiver 302. The first sample rate may correspond to a data rate associated with the wireless network 392, and the second sample rate may correspond to a data rate associated with the wireless network 390. Alternatively, the pre-processing circuitry 364 may be omitted from the receiver 342, and the receive circuitry 360 may be directly coupled to the connection 377, such as if the wireless networks 390, 392 utilize a common data rate.

Upon generating the third signal, the pre-processing circuitry 364 may provide the third signal to the post-processing circuitry 324 via the connection 377. The post-processing circuitry 324 may be configured to perform one or more data processing operations using the third signal. The post-processing circuitry 324 may generate a fourth signal based on the third signal and may provide the fourth signal to the modem 322. The modem 322 may analyze the fourth signal and the network measurements indicated by the fourth signal. For example, the modem 322 may be configured to analyze the network measurements to determine whether the receiver 302 should be tuned to another frequency and/or should initiate communication with a network device, such as in connection with a channel reselection operation by the receiver 302 and/or a "handoff" operation between network devices, such as a handoff operation between the base stations 130, 132 of FIG. 1. As an example, the modem 322 may analyze a signal-to-noise ratio (SNR) of the network measurements to determine whether to perform the channel reselection operation, to perform a handoff operation, and/or whether to associate with a network device. Alternatively or in addition, the host 340 and/or the modem 362 may analyze the network measurements to conserve processing resources of the modem 322.

In an exemplary embodiment, the receiver 342 performs network measurements concurrently with a data reception operation by the receiver 302. To illustrate, the receiver 302 may receive data using a first channel of the wireless network 390 while the receiver 342 operates according to an idle receive mode, such as while the receiver 342 is temporarily idle with respect to a second channel of the wireless network 392. In this example, the receiver 302 may receive a signal via the first communication channel and may process the received signal using one of the LNAs 312, 314 to generate the first signal.

Examples of network measurement operations include cell searches, channel searches, frequency scans, and frequency band scans, such as inter-band and intra-band frequency band scans, as illustrative examples. To further illustrate, in accordance with an exemplary intra-band frequency scan, the receiver 302 may receive a signal associated with a frequency band using a single filter and a single LNA, such as via the filter 304 and the LNA 312. The receive circuitry 320 may process a portion of the received signal (e.g., a frequency associated with an active channel used by the receiver 302), and the receive circuitry 360 may perform network measurements using one or more other components of the received signal (e.g., one or more other frequencies within the frequency band). Performing the network measurements at the receive circuitry 360 may increase data throughput at the receiver 302.

An inter-band frequency scan may concurrently utilize multiple filters and LNAs. For example, in accordance with an exemplary inter-band frequency scan, the receiver 302 may receive a signal via the antenna 310. The filter 304 may filter the received signal to generate a first signal associated with a first frequency band (e.g., an active channel), and one or more other filters (e.g., the filter 306) may filter the received signal to generate one or more other signals associated with one or more other frequency bands (e.g., signals corresponding to additional frequency bands). The switching and selection logic 316 may provide the first signal to the receive circuitry 320. The switching and selection logic 316 may provide the one or more other signals to the receiver 342 via the connection 375 for network measurements to be performed by the receiver 342 to increase data throughput at the receiver 302.

FIG. 3 illustrates that a device (e.g., the receiver 342) may include a first low noise amplifier (LNA) in a first receive path and may further include receive circuitry in the first receive path. The receive circuitry may correspond to the receive circuitry 360, and the first LNA may correspond to any of the LNAs 352, 354. The first receive path may include the antenna 350, the antenna interface circuit 348, the LNAs 352, 354, and the receive circuitry 360. The receive circuitry may be configured to receive an output of the first LNA and to receive an output of a second LNA within a second receive path. The second LNA may correspond to any of the LNAs 312, 314. The second receive path may include the antenna 310, the antenna interface circuit 308, the LNAs 312, 314, and the receive circuitry 320.

The first receive path may be associated with (e.g., used by) the receiver 342, and the second receive path may be associated with (e.g., used by) the receiver 302. For example, FIG. 3 depicts that the receiver 342 may include a portion of a first receive path (e.g., the LNAs 352, 354) and that the receiver 302 may include a portion of a second receive path (e.g., the LNAs 312, 314).

The example of FIG. 3 illustrates that data throughput of a primary receiver can be improved using network measurements generated by an auxiliary receiver. For example, by generating network measurements at the receiver 342, the receiver 302 may continue data reception and processing using a first frequency without having to tune the receive circuitry 320 to a second frequency associated with a second communication channel and/or a second network device (e.g., without adjusting the mixer 336 to a second frequency to generate the network measurements). Accordingly, data throughput of the receiver 302 is increased by using the receiver 342 to perform network measurements.

Figure 4:
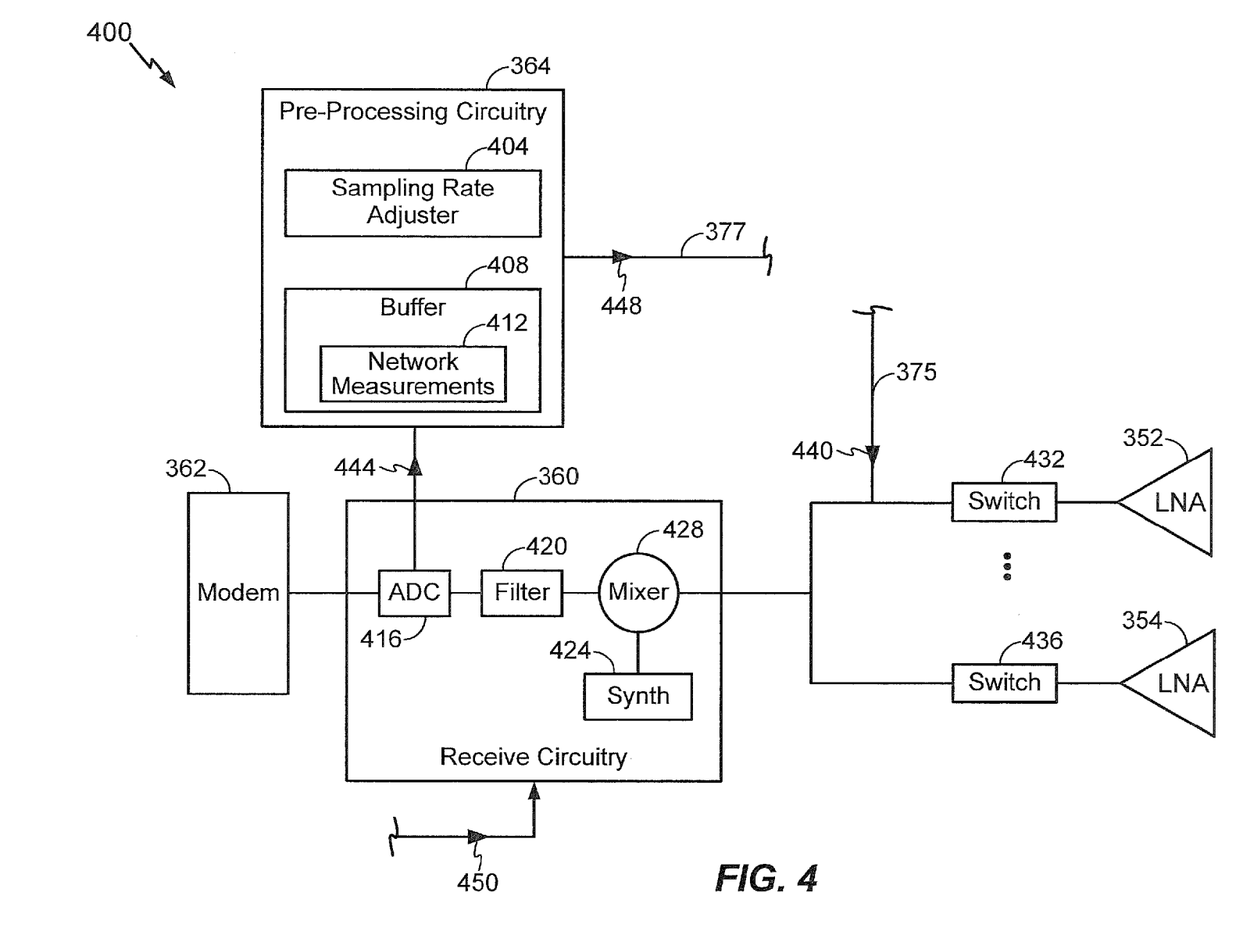
FIG. 4 is a block diagram that depicts an exemplary embodiment of another system that may be included in the wireless device of FIG. 1.

Referring to FIG. 4, an exemplary embodiment of a system 400 is shown. The system 400 corresponds to a receiver, such as the receiver 342 of FIG. 3. The system 400 may include the LNAs 352, 354, the pre-processing circuitry 364, the modem 362, the receive circuitry 360, and the connections 375, 377.

In the example of FIG. 4, the pre-processing circuitry 364 includes a sampling rate adjuster 404 and a buffer 408. The buffer 408 may be configured to buffer signals generated by the receive circuitry 360, such as network measurements 412.

The receive circuitry 360 may include an analog-to-digital converter (ADC) 416, a filter 420, a frequency synthesizer 424, and a mixer 428. The receive circuitry 360 may be configured to generate the network measurements 412.

In the example of FIG. 4, the system 400 may include one or more switches, such as bypass switches 432, 436. The bypass switches 432, 436 may be selectively activated and deactivated by the system 400, such as based on one or more control signals generated by the system 400 upon initiation of an idle receive mode associated with the system 400. To illustrate, while the system 400 is not processing one or more received signals (e.g., using the LNA 352 or the LNA 354), the bypass switches 432, 436 may be deactivated to bypass a portion of the system 400 to reduce spurious signals that may be generated by the LNAs 352, 354 during the idle receive mode. In one or more other implementations, the bypass switches 432, 436 may be omitted from the system 400. For example, the LNAs 352, 354 may be directly coupled to the connection 375 and to the receive circuitry 360. The bypass switches 432, 436 may be integrated in a single (or "global") switch.

In operation, the connection 375 may receive one or more signals from a primary receiver, such as a signal 440. For example, during an idle receive mode of the system 400 when the system 400 is not receiving wireless signals (e.g., via the antenna 350 of FIG. 3), the system 400 may initiate an auxiliary mode of operation. During the auxiliary mode of operation, the receive circuitry 360 may receive the signal 440 from the receiver 302 of FIG. 3 via the connection 375. The signal 440 may correspond to an output (e.g., an amplified signal) generated by one of the LNAs 312, 314 provided by the switching and selection logic 316 of FIG. 3. During the auxiliary mode of operation, the LNAs 352, 354 may be decoupled from the receive circuitry 360 while the signal 440 is received via the connection 375. For example, the bypass switch 432 may decouple the LNA 352 from the receive circuitry 360, and the bypass switch 436 may decouple the LNA 354 from the receive circuitry 360. During the auxiliary mode of operation, the modem 362 may enter a low-power mode of operation to conserve power at the system 400.

In FIG. 4, the receive circuitry 360 is coupled to receive the signal 440 and to generate a signal 444 based on the signal 440. The signal 444 may indicate the network measurements 412. The signal 444 may correspond to a digital baseband signal including samples of a wireless channel. To illustrate, the frequency synthesizer 424 may be tuned to generate a synthesized signal having a first frequency. The mixer 428 may be responsive to the frequency synthesizer 424 to selectively filter frequency components of the signal 440 to generate a down-converted signal. For example, the mixer 428 may "mix" the synthesized signal with the signal 440 to generate the down-converted signal having a second frequency. The down-converted signal may be provided to the filter 420 to generate a filtered signal. The ADC 416 may digitize the filtered signal to generate the signal 444. In this example, the network measurements 412 may indicate a signal strength of a signal having the second frequency, such as an availability of a communication channel that uses the second frequency. Alternatively or in addition, the network measurements 412 may include information indicating availability of a network device, such as an identification of a base station within communication range of the system 400. The identification of the base station may be "broadcast" by the base station using a signal having the second frequency, which may be different than a frequency used by the receiver 302 of FIG. 3 to perform data reception operations.

The receive circuitry 360 may be responsive to a control signal 450. The control signal may be generated by the host 340 or by the receiver 302. The control signal 450 may determine one or more operating parameters of the receive circuitry 360. For example, the control signal 450 may specify the frequency (or frequency band) of the frequency synthesizer 424 and/or a receiver gain of the receive circuitry 360, as illustrative examples. To illustrate, the control signal 450 may include a multi-bit digital signal with a first field having one or more bit values indicating the frequency of the frequency synthesizer 424 and a second field having one or more bit values indicating the receiver gain of the receive circuitry 360. The receive circuitry 360 may generate the signal 444 based on the control signal 450.

The pre-processing circuitry 364 may be responsive to the signal 444. To illustrate, the buffer 408 may buffer the signal 444. The signal 444 may correspond to digitized samples generated by the ADC 416 and may indicate the network measurements 412. In an exemplary implementation, the pre-processing circuitry 364 may adjust a sample rate of the network measurements 412 via the sampling rate adjuster 404. To illustrate, the sampling rate adjuster 404 may increase a sample rate associated with the network measurements 412, such as by up-sampling the network measurements 412, or may decrease a sample rate associated with the network measurements 412, such as by down-sampling the network measurements 412.

The pre-processing circuitry 364 may generate a signal 448 based on the signal 444. The signal 448 indicates (e.g., represents) the network measurements 412. Alternatively, in one or more implementations, the receive circuitry 360 may provide the signal 444 directly to the receiver 302 of FIG. 3. In such an example, the pre-processing circuitry 364 may be omitted from the system 400. For example, if pre-processing is not to be performed by the system 400, the signal 444 may be provided directly to the receiver 302 of FIG. 3 (where a sample rate used by the receiver 302 is equal to a sample rate used by the system 400).

The system 400 may provide the network measurements 412 to the receiver 302 via the connection 377. Depending on the implementation, the system 400 may "push" the network measurements 412 to the receiver 302, or the receiver 302 may request (e.g., "pull") the network measurements 412 from the system 400. The receiver 302 may utilize the network measurements 412 indicated by the signal 448 to maintain network connectivity within a wireless network, such as by using the network measurements 412 to determine whether to initiate communication using another communication channel and/or another network device.

By generating the network measurements 412, the system 400 may "assist" the receiver 302. The system 400 may generate the network measurements 412 during an idle receive time during which the system 400 is not receiving wireless signals. For example, the system 400 may generate the network measurements 412 during a time period when the system 400 would otherwise be idle or in a "standby" mode of operation. Accordingly, data throughput may be enhanced at a device that includes the system 400 without incurring a performance penalty (e.g., without temporarily ceasing a data reception operation at the device to generate the network measurements 412).

Figure 5:
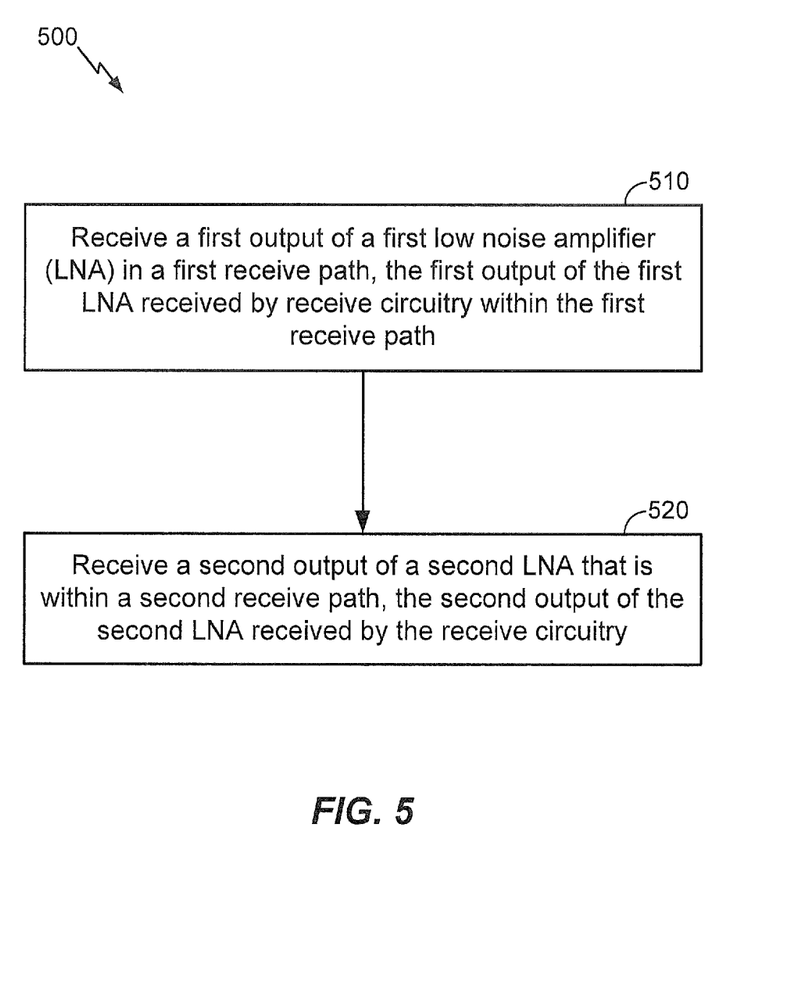
FIG. 5 is a flowchart that illustrates an exemplary embodiment of a method of operating a device, such as the wireless device of FIG. 1.

Referring to FIG. 5, an exemplary embodiment of a method 500 is shown. The method 500 may be performed by a device, such as by a receiver of the wireless device 110 of FIGS. 1 and 2. In an exemplary implementation, the method 500 is performed by the receiver 342 of FIG. 3. Alternatively or in addition, the method 500 may be performed by the system 400 of FIG. 4.

The method 500 includes receiving a first output of a first low noise amplifier (LNA) in a first receive path, at 510. The first output of the first LNA is received by receive circuitry within the first receive path. The receive circuitry may correspond to the receive circuitry 360, and the first LNA may correspond to any of the LNAs 352, 354. The first receive path may include the antenna 350, the antenna interface circuit 348, the LNAs 352, 354, and the receive circuitry 360.

The method 500 may further include receiving a second output of a second LNA that is within a second receive path, at 520. The second output of the second LNA is received by the receive circuitry. The second LNA may correspond to any of the LNAs 312, 314. The second receive path may include the antenna 310, the antenna interface circuit 308, the LNAs 312, 314, and the receive circuitry 320.

The first receive path may be associated with (e.g., used by) a first receiver, and the second receive path may be associated with (e.g., used by) a second receiver. For example, the first receive path may be associated with the receiver 342, and the second receive path may be associated with the receiver 302. In this case, the receiver 342 may include the first receive path (or a portion of the first receive path), and the receiver 302 may include the second receive path (or a portion of the second receive path).

The receive circuitry may receive the output of the first LNA at a first time, and the receive circuitry may receive the output of the second LNA a second time. To illustrate, the first time may correspond to a first mode of operation of the receiver 342, and the second time may correspond to a second mode of operation of the receiver 342. The receiver 342 may be active with respect to the wireless network 392 (e.g., actively receiving data via the wireless network 392) during the first mode, and the receiver 342 may be idle with respect to the wireless network 392 during the second mode (e.g., not receiving data via the wireless network 392). As a particular example, the receiver 342 may be idle with respect to the wireless network 392 while the receiver 302 receives a signal via the wireless network 390 and while one of the LNAs 312, 314 generates an output based on the signal received via the wireless network 390.

The method 500 may increase data throughput at a wireless device, such as the wireless device 110. For example, by concurrently receiving data using the receiver 302 and performing network measurements using the receiver 342, the system 300 increases data throughput as compared to temporarily ceasing data reception to perform network measurements. Accordingly, data throughput is increased.

In conjunction with the described embodiments, an apparatus includes means for interfacing with a first receiver that includes a low noise amplifier and for receiving a first signal from the low noise amplifier. The means for interfacing with the first receiver may correspond to the connection 375. The first signal may correspond to the signal 440. The low noise amplifier may correspond to any of the LNAs 312, 314, and the first receiver may correspond to the receiver 302. The apparatus further includes means within a second receiver for generating a second signal based on the first signal. The second signal may correspond to a network measurement usable by the receiver. The means for generating the second signal may correspond to the receive circuitry 360, the second signal may correspond to the signal 444, and the second receiver may correspond to the receiver 342.

Although certain illustrative examples have been provided, it should be appreciated that additional embodiments or alternative implementations are consistent with the present disclosure. For example, although the receivers 302, 342 have been respectively described as primary and auxiliary receivers, it should be appreciated that the receiver 302 may operate as an auxiliary receiver that performs one or more operations (e.g., network measurements) for a primary receiver, which may correspond to the receiver 342. In such embodiments, one or more components and/or operations illustrated with reference to the receiver 342 may be implemented with respect to the receiver 302, and vice versa. As an illustrative example, switching and selection logic corresponding to the switching and selection logic 316 may be implemented within the receiver 342, and pre-processing circuitry corresponding to the pre-processing circuitry 364 may be implemented with the receiver 302.

In accordance with an exemplary "quasi-parallel" network measurement technique, the receivers 302, 342 may perform network measurements in parallel, such as during idle receive times associated with the receivers 302, 342. In an exemplary design, the receiver 302 corresponds to a WAN receiver, and the receiver 342 corresponds to a WLAN receiver configured to process signals having a large bandwidth. In this example, the receiver 342 may perform network measurements in parallel with the receiver 302. In certain cases, a WLAN receiver may support a high bandwidth, which may enable the WLAN receiver to perform measurements for a large bandwidth rapidly (e.g., in a "single shot"), improving device performance.

Certain data reception operations herein have been described in terms of a single receive "chain." For example, certain data reception operations have been described with reference to single carrier, single data stream, and single antenna systems. It should be appreciated that a receiver may include multiple receive chains, such as multiple carriers, multiple data streams, and/or multiple antennas. In an exemplary embodiment, a receiver may include multiple receive chains and multiple frequency synthesizers. The multiple frequency synthesizers may include a dedicated frequency synthesizer that the receiver uses during an active receive mode (e.g., during a data reception operation of the receiver) to generate network measurements concurrently with a data reception operation by the receiver. The network measurements may be performed using an idle receive chain of the multiple receive chains while another receive chain of the multiple receive chains performs a data reception operation. Alternatively or in addition, in a carrier aggregation system, if a receive chain allocated to an aggregated carrier is idle during a data reception operation, the receive chain may be used to perform network measurements.

Figure 6:
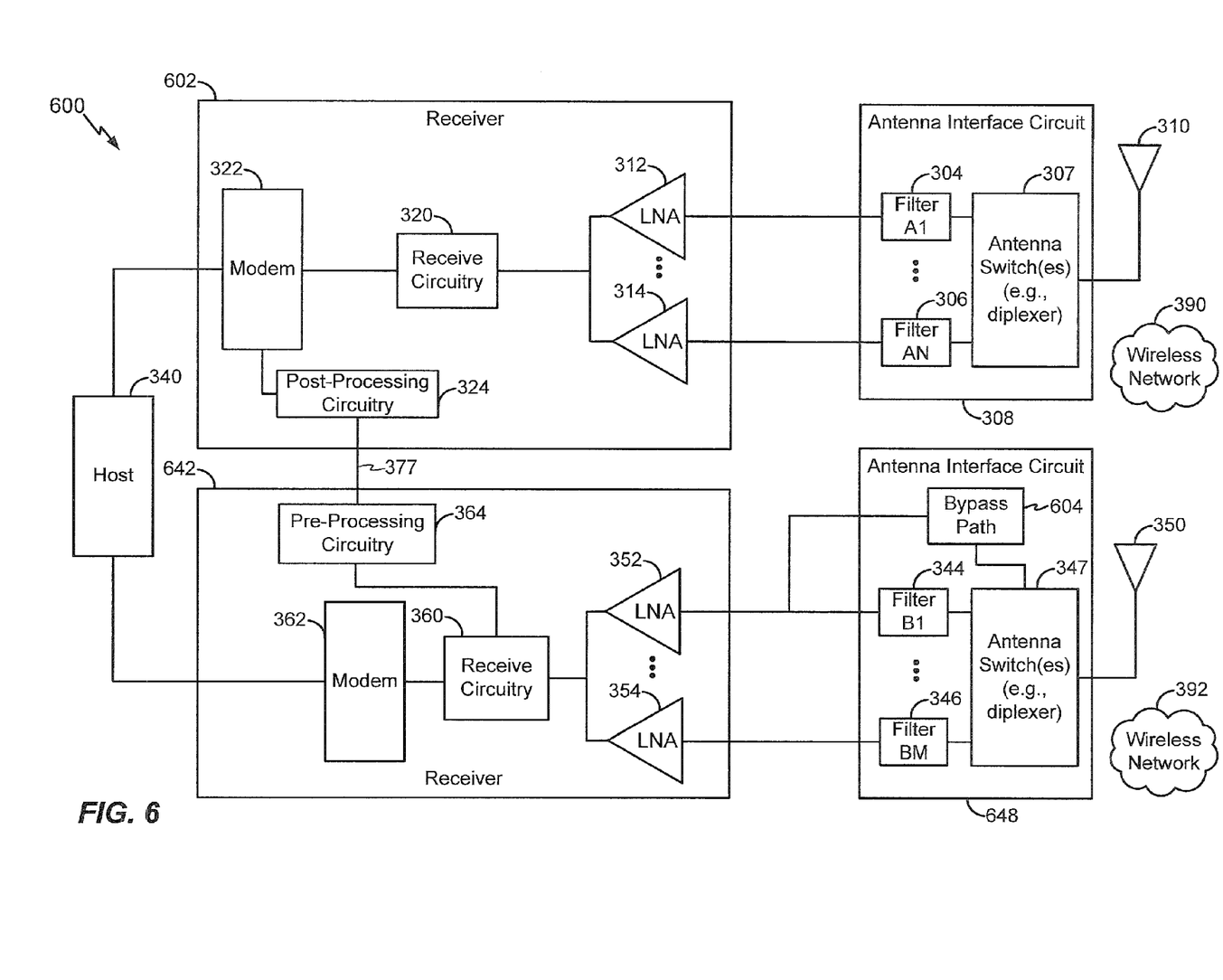
FIG. 6 is a block diagram that depicts an exemplary embodiment of another system that may be included in the wireless device of FIG. 1.

A receiver may be configured to bypass native filtering in order to facilitate performing network measurements for another receiver. For example, the receiver 342 may include switching and selection logic coupled between the antenna 350 and the LNAs 352, 354. The switching and selection logic may be controllable (e.g., by the receiver 302) to cause the receiver 342 to "bypass" the filters 344, 346 to cause the receiver 342 to receive signals in a target frequency or frequency band. Such an implementation may be useful in applications that do not include a large number of "blocker" signals. For example, by bypassing the filters 344, 346, the receiver 342 may be more susceptible to blockers, such as blockers caused by operation of a transmitter of the system 300. FIG. 6 illustrates an example of a receiver configured to bypass native filtering.

Referring to FIG. 6, an exemplary embodiment of a system 600 is shown. The system 600 may include a receiver 602, a receiver 642, and an antenna interface circuit 648. The receiver 602 may be coupled to the host 340 and to the antenna interface circuit 308. The receiver 602 may include the LNAs 312, 314, the receive circuitry 320, the modem 322, and the post-processing circuitry 324. The receiver 642 may be coupled to the host 340 and to the antenna interface circuit 648. The receiver 642 may include the LNAs 352, 354, the receive circuitry 360, the modem 362, and the pre-processing circuitry 364.

The antenna interface circuit 648 may include a bypass path 604 (e.g., a switch), the one or more antenna switches 347, and the filters 344, 346. The antenna interface circuit 648 may be coupled to the antenna 350 and may be responsive to signals sent via the wireless network 392. The antenna interface circuit 308 may include the one or more antenna switches 307 and the filters 304, 306. The antenna interface circuit 308 may be coupled to the antenna 310 and may be responsive to signals sent via the wireless network 390.

In operation, the receiver 642 may use the bypass path 604 to bypass the filters 344, 346 to perform one or more network measurements for the receiver 602. For example, when the receiver 642 is idle with respect to the wireless network 392 (e.g., when signals are not being received by the receiver 642 via the wireless network 392), the receiver 642 may bypass the filters 344, 346. The receiver 642 may generate network measurements for the receiver 602 and may provide the network measurements to the receiver 602 via the connection 377. In one or more other implementations, the receiver 602 may request or initiate network measurements to be taken by the receiver 642.

To illustrate, if the modem 322 detects that a signal-to-noise ratio (SNR) of a signal received via a channel associated with the filter 304 fails to satisfy a threshold, the modem 322 may send a message to the host 340 indicating that the SNR fails to satisfy the threshold. In response to the message, the host 340 may determine whether the receiver 342 is idle with respect to the wireless network 392 (e.g., based on communications with the modem 362). If the receiver 342 is idle with respect to the wireless network 392, the host 340 may request the receiver 642 to bypass native filtering operations associated with the filters 344, 346 by activating the bypass path 604. Alternatively, the host 340 may activate the bypass path 604. In one or more other implementations, the receiver 602 may activate the bypass path 604. Further, the one or more antenna switches 347 may decouple the filters 344, 346 from the antenna 350.

After activating the bypass path 604, a received signal may be provided from the antenna 350 to the LNA 352. The received signal may correspond to an "unfiltered" signal having a high bandwidth. The LNA 352 may generate an amplified signal based on the received signal, and the receive circuitry 360 may process the amplified signal.

For example, the receive circuitry 360 may include a mixer (e.g., the mixer 428 of FIG. 4). The receive circuitry 360 may be responsive to a control signal (e.g., the control signal 450) from the host 340 or from the receiver 602 indicating a frequency band (e.g., for a handoff operation to another channel, such as a channel corresponding to the filter 306). The mixer may selectively filter frequency components of the amplified signal to generate a down-converted signal within the frequency band. The receive circuitry 360 may filter the down-converted signal (e.g., at the filter 420) to generate a filtered signal. The receive circuitry 360 may digitize the filtered signal (e.g., at the ADC 416) to generate digital samples.

The digital samples may correspond to network measurements that are provided to the receiver 602 (e.g., via the connection 377) to enable the receiver 602 to maintain network connectivity within the wireless network 390. For example, the modem 322 may analyze the network measurements to determine whether a handoff operation is to be performed (e.g., from a channel associated with the filter 304 to a channel associated with the filter 306). To further illustrate, the modem 322 may analyze the network measurements to determine that a signal strength of a signal associated with a channel corresponding to the filter 306 is greater than (e.g., by a threshold difference) a signal strength of a signal associated with a channel corresponding to the filter 304.

The example of FIG. 6 illustrates bypassing of the filters 344, 346 to enable the receiver 642 to perform network measurements for the receiver 602. Such an implementation may be advantageous in applications that do not include a large number of "blocker" signals. Bypassing the filters 344, 346, a received signal may have a large bandwidth that is susceptible to blockers, such as blockers caused by operation of a transmitter of the system 600 within a certain frequency band. The system 600 may therefore be useful in a device in which a large number of blocker signals are not present or expected (e.g., within a device having relatively isolated transmitter and receiver portions).

In another implementation, filters of a receiver of a device are "duplicated" at another receiver of the device. To illustrate, one or more filters corresponding to the filters 304, 306 of the receiver 302 may be implemented within the receiver 342. In this example, the receiver 342 may selectively route signals received via the antenna 350 to the one or more filters to perform network measurements for the receiver 302. The one or more filters may be configured to suppress or reduce "blocking" signals. In some applications, the one or more filters may be expensive and/or large and thus may be associated with higher device cost and/or circuit area than other implementations. An example of a receiver with "duplicated" filters is described with reference to FIG. 7.

Figure 7:
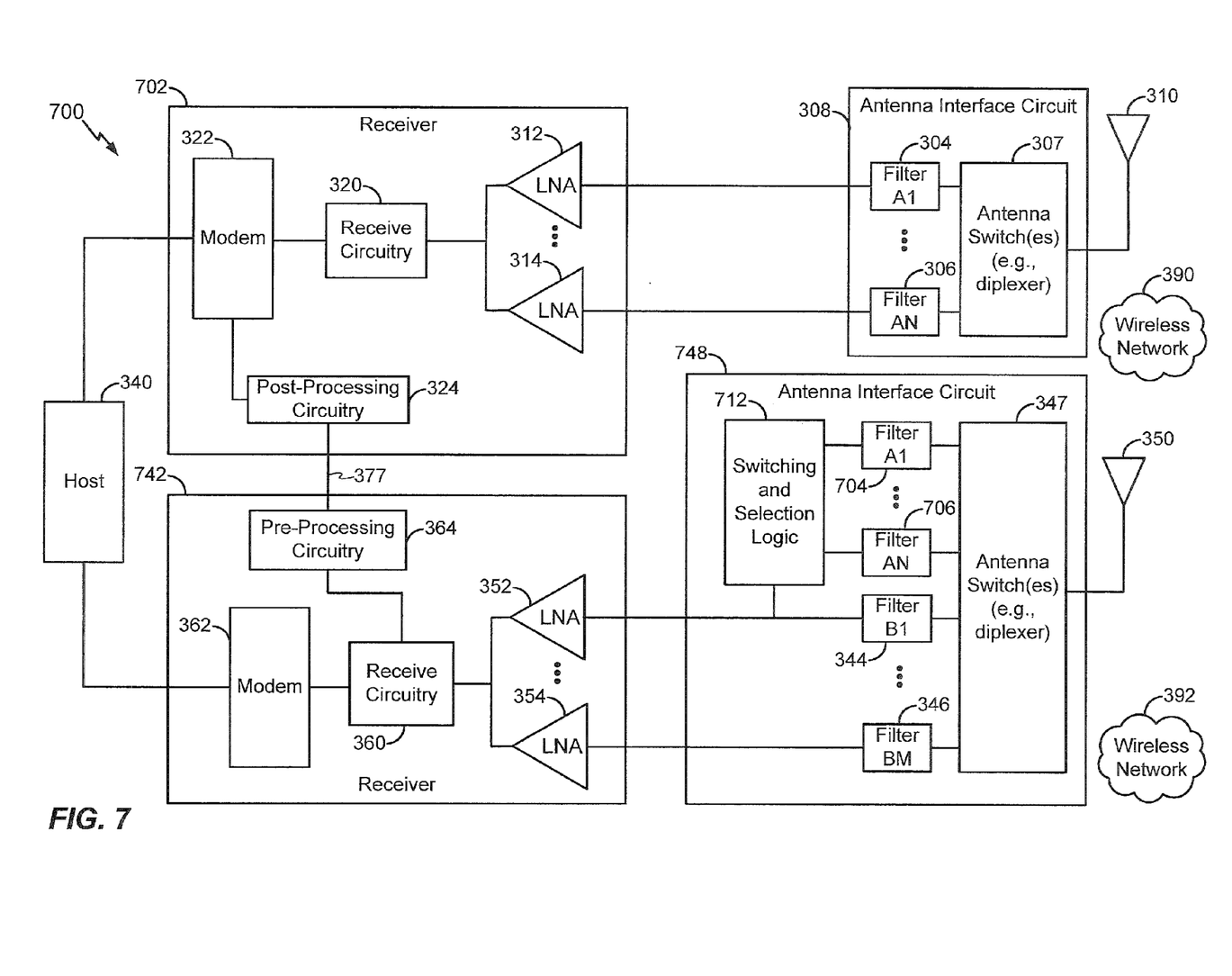
FIG. 7 is a block diagram that depicts an exemplary embodiment of another system that may be included in the wireless device of FIG. 1.

Referring to FIG. 7, an exemplary illustrative embodiment of a system 700 is shown. The system 700 may include a receiver 702, a receiver 742, and an antenna interface circuit 748. The receiver 702 may be coupled to the host 340 and to the antenna interface circuit 308. The receiver 702 may include the LNAs 312, 314, the receive circuitry 320, the modem 322, and the post-processing circuitry 324. The receiver 742 may be coupled to the host 340 and to the antenna interface circuit 748. The receiver 742 may include the LNAs 352, 354, the receive circuitry 360, the modem 362, and the pre-processing circuitry 364.

In the example of FIG. 7, the antenna interface circuit 748 includes a filter 704, a filter 706, switching and selection logic 712, the one or more antenna switches 347, and the filters 344, 346. The antenna interface circuit 748 may be coupled to the antenna 350 and may be responsive to signals sent via the wireless network 392. The antenna interface circuit 308 may include the one or more antenna switches 307 and the filters 304, 306. The antenna interface circuit 308 may be coupled to the antenna 310 and may be responsive to signals sent via the wireless network 390.

The filters 704, 706 may "duplicate" the filters 304, 306. For example, as described with reference to FIG. 3, the filter 304 may be associated with the first frequency band (A1) (e.g., a first channel), and the filter 306 may be associated with the Nth frequency band (AN) (e.g., a second channel), where "N" is a positive integer. In the example of FIG. 7, the filter 704 may be associated with the first frequency band (A1), and the filter 706 may be associated with the Nth frequency band (AN).

In operation, the receiver 742 may be idle with respect to the wireless network 392, such as when the receiver 742 is not receiving signals via the wireless network 392. In response to the receiver 742 being idle, the one or more antenna switches 347 may decouple the filters 344, 346 from the antenna 350. For example, the one or more antenna switches 347 may be responsive to the modem 362, and the modem 362 may assert one or more control signals to cause the one or more antenna switches 347 to decouple the filters 344, 346 from the antenna 350.

The switching and selection logic 712 may selectively couple one of the filters 704, 706 to the LNA 352. For example, the switching and selection logic 712 may be responsive to a control signal from the receiver 702 indicating which of the filters 704, 706 is to be coupled to the LNA 352.

In an exemplary embodiment, the receiver 742 performs one or more network measurements based on signals within the Nth frequency band (AN) using the filter 706 while the receiver 702 receives signals within the first frequency band (A1) using the filter 304. To illustrate, the receiver 702 may receive signals via a channel associated with the filter 304. The receiver 742 may send a control signal to the switching and selection logic 712 causing the switching and selection logic 712 to select the filter 706, and the one or more antenna switches 347 may be deactivated (e.g., in response to initiation of the idle mode of operation of the receiver 742) to decouple the filters 344, 346 from the antenna 350. By selecting the filter 706 and decoupling the filters 344, 346 from the antenna 350, the switching and selection logic 712 may provide a signal within the Nth frequency band (AN) to the LNA 352.

The LNA 352 may be responsive to the signal to generate an amplified signal. The receive circuitry 360 may be responsive to the amplified signal to generate network measurements, and the network measurements may be provided to the receiver 702 (e.g., via the connection 377). The receiver 702 may utilize the network measurements to maintain network connectivity within the wireless network 390. For example, the modem 322 may analyze the network measurements to determine whether to initiate a handoff operation from a channel corresponding to the filter 304 to a channel corresponding to the filter 306.

The example of FIG. 7 illustrates that filters can be "duplicated" at an auxiliary receiver to enable network measurements by the auxiliary receiver for a primary receiver. Such an implementation may reduce costs and device complexity associated with the primary receiver (e.g., by avoiding or reducing switching and selection logic in a receive path that includes the antenna 310, the antenna interface circuit 308, and the receiver 702). Regarding the example of FIG. 7, an "insertion loss" (e.g., signal distortion, frequency selectivity, and/or other degradation) may be associated with the switching and selection logic 712. Accordingly, use of the system 700 may be advantageous in an application in which high signal strength is expected at the receiver 742 and in which a certain amount of insertion loss is tolerable (e.g., does not cause signal strength to be less than an operating parameter associated with the receiver 742).

In another implementation, an input of an LNA stage of a receiver is coupled to an input of an LNA stage of another receiver. To illustrate, the receiver 302 may include switching and selection logic coupled between the filters 304, 306 and the LNAs 312, 314. The switching and selection logic may be configured to selectively route received signals to inputs of the LNAs 352, 354 of the receiver 342. In this example, a single antenna (e.g., the antenna 310) can be used to receive signals that are used to generate data and network measurements, which may improve accuracy of the network measurements as compared to using multiple antennas to receive data and perform network measurements. The network measurements may include inter-band and intra-band frequency band scans. Implementing switching and selection logic at the input of an LNA stage may add front-end insertion loss to a primary receiver, which may be preferable to adding front-end insertion loss to an auxiliary receiver in certain cases. An example of a primary receiver that includes front-end switching and selection logic is described with reference to FIG. 8.

Figure 8:
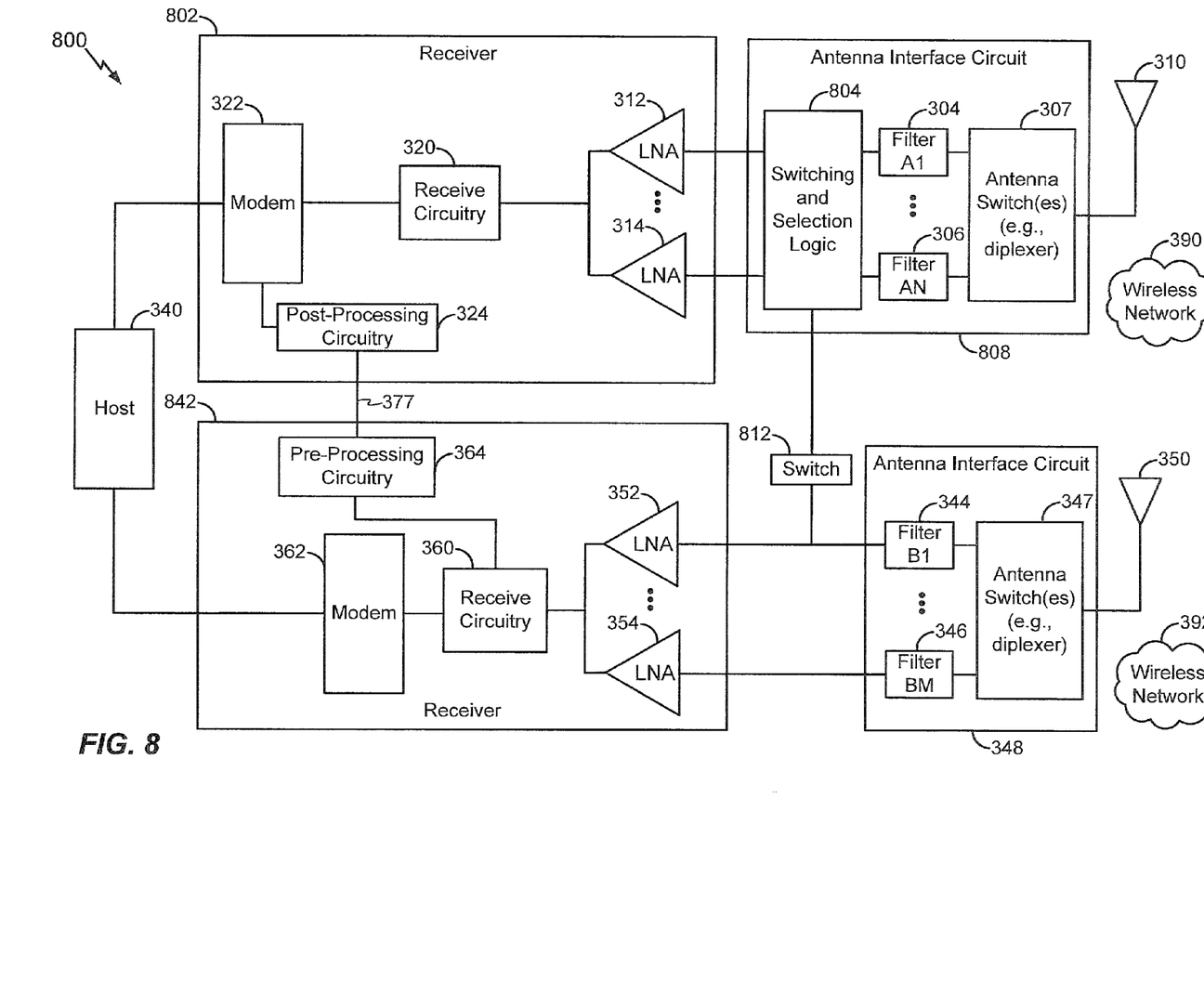
FIG. 8 is a block diagram that depicts an exemplary embodiment of another system that may be included in the wireless device of FIG. 1.

Referring to FIG. 8, an exemplary illustrative embodiment of a system 800 is shown. The system 800 may include a receiver 802, a receiver 842, switching and selection logic 804, an antenna interface circuit 808, and a switch 812. The receiver 802 may be coupled to the host 340 and to the antenna interface circuit 808 via the switching and selection logic 804. The receiver 802 may include the LNAs 312, 314, the receive circuitry 320, the modem 322, and the post-processing circuitry 324. The receiver 842 may be coupled to the host 340 and to the antenna interface circuit 348. The receiver 842 may include the LNAs 352, 354, the receive circuitry 360, the modem 362, and the pre-processing circuitry 364.

The antenna interface circuit 348 may include the one or more antenna switches 347 and the filters 344, 346. The antenna interface circuit 348 may be coupled to the antenna 350 and may be responsive to signals sent via the wireless network 392. The antenna interface circuit 808 may include switching and selection logic 804, the one or more antenna switches 307, and the filters 304, 306. The antenna interface circuit 808 may be coupled to the antenna 310 and may be responsive to signals sent via the wireless network 390. The switching and selection logic 804 may be coupled to the switch 812, and the switch 812 may be coupled to the antenna interface circuit 348 and to the receiver 842.

In operation, the receiver 802 may initiate a network measurement operation. To illustrate, the receiver 802 may receive a signal via the wireless network 390 using a channel corresponding to the filter 304. If a signal strength of the signal (e.g., a signal-to-noise ratio (SNR) of the signal) fails to satisfy a threshold, the receiver 802 may initiate the network measurement operation to determine whether to initiate a handoff operation from the channel corresponding to the filter 304 to a channel corresponding to the filter 306. In this example, the network measurement operation may correspond to an "inter-band" frequency scan that scans for a channel (e.g., a channel within the Nth frequency band (AN) associated with the filter 306) that is different from a channel currently being used to perform a data reception operation (e.g., a channel within the first frequency band (A1) associated with the filter 304).

To initiate the network measurement operation in connection with an inter-band frequency scan, the receiver 802 may cause the switching and selection logic 804 to output a signal from the filter 306 to the switch 812. For example, the switching and selection logic 804 may be responsive to a control signal from the modem 322. The switching and selection logic 804 may output the signal from the filter 306 while also providing a signal from the filter 304 to the LNA 312 (e.g., during a data reception operation that receives data via a channel associated with the filter 304) to initiate the inter-band frequency scan.

A network measurement operation may be initiated to perform an "intra-band" frequency scan. To illustrate, network measurements may be performed to determine availability of one or more channels within the first frequency band (A1) associated with the filter 304 while the receiver 802 is performing a data reception operation using one or more signals received via the filter 304. In this example, the switching and selection logic 804 may output a signal from the filter 304 to the LNA 312 and further to the switch 812. While the receiver 802 processes the signal (e.g., to receive data sent via the wireless network 390), the receiver 842 may perform one or more network measurements using the signal, such as to scan for channels within the first frequency band (A1) while the receiver is idle with respect to the wireless network 392.

If the receiver 842 is idle with respect to the wireless network 392 (e.g., is not performing a data reception operation using the antenna 350), the receiver 842 may activate the switch 812. For example, the modem 362 may send a control signal to the switch 812 activating the switch 812. Alternatively, in one or more other implementations, the host 340 may determine that the receiver 842 is idle, and the host 340 may activate the switch 812 via a control signal. Further, the receiver 842 may send a control signal to the one or more antenna switches 347 to cause the one or more antenna switches 347 to decouple the filters 344, 346 from the antenna 350 (e.g., to prevent or reduce leakage of signals from the antenna 350 to the receiver 842 during the idle mode).

The LNA 352 may be responsive to the signal provided by the switch 812. The receive circuitry 360 may be responsive to the LNA 352 to generate network measurements, and the network measurements may be provided to the receiver 802 (e.g., via the connection 377). The receiver 802 may utilize the network measurements to maintain network connectivity within the wireless network 390. For example, the modem 322 may analyze the network measurements to determine whether to initiate a handoff operation (e.g., between channels of a common frequency band, or between channels of different frequency bands). To further illustrate, the modem 322 may analyze the network measurements to determine that a signal strength of a signal associated with a first channel of the wireless network 390 is greater than (e.g., by a threshold difference) a signal strength of a signal associated with a second channel of the wireless network 390.

The example of FIG. 8 illustrates that data throughput at the receiver 802 may be enhanced by providing a signal from the antenna interface circuit 808 to the receiver 842. For example, the receiver 842 may perform network measurements while the receiver 802 performs a data reception operation. Accordingly, the receiver 802 may avoid a latency associated with temporarily interrupting the data reception operation to generate the network measurements, improving data throughput at the receiver 802. Further, the example of FIG. 8 does not add "extra" filters to either of the antenna interface circuits 348, 808 (e.g., does not "duplicate" filters), which reduces device cost and complexity of a wireless device that includes the system 800.

In connection with the described embodiments, an apparatus includes means for bypassing one or more filters associated with a first network that is accessed by a first receiver. The one or more filters may correspond to one or more of the filters 344, 346, and the first network may correspond to the wireless network 392 (e.g., the first network may include the wireless network 392). The apparatus further includes means for generating, responsive to the means for bypassing, a second signal associated with a second network that is accessed by a second receiver. The means for generating the second signal is within the first receiver. The means for generating the second signal may correspond to the receive circuitry 360, the second signal may correspond to the signal 444, and the second network may correspond to the wireless network 390 (e.g., the second network may include the wireless network 390). As explained further below, the first receiver may correspond to any of the receivers 342, 642, 742, and 842, and the second receiver may correspond to any of the receivers 302, 602, 702, and 802.

In an exemplary embodiment, the first receiver corresponds to the receiver 342, and the second receiver corresponds to the receiver 302. In this example, the means for bypassing the one or more filters may include a switch, such as any of the bypass switches 432, 436.

In another exemplary embodiment, the first receiver corresponds to the receiver 642, and the second receiver corresponds to the receiver 602. In this example, the means for bypassing the one or more filters may include a bypass path (e.g., the bypass path 604) of an antenna interface circuit (e.g., the antenna interface circuit 648) that includes the one or more filters.

In another exemplary embodiment, the first receiver corresponds to the receiver 742, and the second receiver corresponds to the receiver 702. In this example, the means for bypassing the one or more filters may include switching and selection logic (e.g., the switching and selection logic 712) coupled to a second filter (e.g., any of the filters 704, 706) associated with a frequency band, such as the first frequency band (A1) or the Nth frequency band (AN). The frequency band is associated with the second network (e.g., the frequency band may correspond to a channel of the wireless network 390).

In another exemplary embodiment, the first receiver corresponds to the receiver 842, and the second receiver corresponds to the receiver 802. In this example, the means for bypassing the one or more filters may include a switch, such as the switch 812. The switch may be coupled to receive a signal from an antenna interface circuit associated with the second receiver, such as from the antenna interface circuit 808. One of skill in the art will appreciate that such examples are illustrative and that other implementations and examples are also consistent with the present disclosure.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. To illustrate, the data processor/controller 260 and/or the host 340 may execute instructions to communicate with one or both of the receivers 302, 342. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. To illustrate, the data processor/controller 260 and/or the host 340 may execute instructions to communicate with one or both of the receivers 302, 342. As another example, the receiver 342 may include hardware and/or a software module executable by a processor to perform one or more operations of the method 500. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
   a first low noise amplifier (LNA) in a first receive path, the first receive path associated with a first receiver;
   receive circuitry in the first receive path, the receive circuitry coupled to an output of the first LNA and coupled to an output of a second LNA within a second receive path, the second receive path associated with a second receiver; and
   circuitry including a sampling rate adjuster and a buffer, the circuitry coupled to an output of the receive circuitry and coupled to an input of the second receiver.

2. The apparatus of claim 1, wherein the first receiver is coupled to the second receiver via pre-processing circuitry.

3. The apparatus of claim 1, wherein the receive circuitry is configured to receive the output of the first LNA during a first mode of the first receiver at a first time, and wherein the receive circuitry is further configured to receive the output of the second LNA during a second mode of the first receiver at a second time.

4. The apparatus of claim 1, wherein the circuitry the pre-processing circuitry configured to provide a network measurement to the second receiver to increase data throughput of the second receiver by enabling the second receiver to detect availability of one or more network resources.

5. The apparatus of claim 1, wherein:
   the receive circuitry is responsive to a first signal generated by the second LNA to generate a second signal, and
   the circuitry is configured to generate a third signal based on the second signal, the third signal representing a network measurement.

6. The apparatus of claim 1, wherein:
   the receive circuitry is configured to generate a second signal based on a first signal from the second receiver;
   the sampling rate adjuster is configured to adjust a sampling rate of the second signal to generate a third signal; and
   the buffer is configured to buffer samples of the third signal.

7. The apparatus of claim 6, wherein the sampling rate adjuster is further configured to adjust a sample rate of the samples from a first sample rate associated with the first receiver to a second sample rate associated with the second receiver.

8. The apparatus of claim 1, further comprising a switch, wherein the switch is coupled to the first LNA, and wherein the switch is configured to decouple the first LNA from the receive circuitry while the receive circuitry receives the output of the second LNA.

9. The apparatus of claim 1, further comprising a shared path that couples the receive circuitry to the first LNA and to the second LNA to enable sharing of resources between the first receive path and the second receive path.

10. The apparatus of claim 1, further comprising a modem that is coupled to the receive circuitry, wherein the modem is configured to enter a low-power mode of operation while the receive circuitry receives the output of the second LNA.

11. A method comprising:
    receiving a first output of a first low noise amplifier (LNA) in a first receive path associated with a first receiver, the first output of the first LNA received by receive circuitry within the first receive path;
    receiving a second output of a second LNA that is within a second receive path associated with a second receiver, the second output of the second LNA received by the receive circuitry; and
    adjusting a sampling rate of a second signal to generate a third signal, the second signal based on a first signal from the second LNA, and buffering samples of the third signal.

12. The method of claim 11, wherein the receive circuitry receives the output of the first LNA during a first mode of the first receiver at a first time.

13. The method of claim 12, wherein the receive circuitry receives the output of the second LNA during a second mode of the first receiver at a second time.

14. The method of claim 12, wherein the first receiver is idle with respect to a first wireless network associated with the first receiver while the second receiver receives a signal via a second wireless network and generates the second output of the second LNA based on the signal.

15. The method of claim 14, wherein the first wireless network corresponds to a local data network, and wherein the second wireless network corresponds to a cellular network.

16. An apparatus comprising:
- means for amplifying a first signal, wherein the means for amplifying the first signal is included in first means for propagating received signals, the first means for propagating received signals associated with first means for receiving signals;
- means for receiving an output of the means for amplifying the first signal and for receiving an output of means for amplifying a second signal, wherein the means for receiving is included in the first means for propagating received signals, and wherein the means for amplifying the second signal is included in second means for propagating received signals, the second means for propagating received signals associated with second means for receiving signals; and
- means for adjusting a sampling rate and for buffering a signal, the means for adjusting and buffering coupled to an output of the means for receiving and coupled to an input of the second means for receiving signals.

17. The apparatus of claim 16, wherein the first means for receiving signals is coupled to the second means for receiving signals via means for providing a network measurement.

18. The apparatus of claim 16, wherein the means for adjusting and buffering includes means for providing a network measurement to the input of the second means for receiving signals.

19. The apparatus of claim 16, further comprising means for selectively decoupling the means for amplifying the first signal from the means for receiving.

20. The apparatus of claim 16, further comprising means for coupling the means for receiving to the means for amplifying the first signal and to the means for amplifying the second signal.

* * * * *